United States Patent [19]

Sundstrom

[11] Patent Number: 5,014,513
[45] Date of Patent: May 14, 1991

[54] SELF-SEALING TRANSFER TUBE FOR PORT PLATE

[75] Inventor: Vernon L. Sundstrom, Rockford, Ill.

[73] Assignee: Sundstrand Corporation, Rockford, Ill.

[21] Appl. No.: 400,349

[22] Filed: Aug. 30, 1989

[51] Int. Cl.$^5$ .............................................. F04B 39/12
[52] U.S. Cl. ........................................ 60/456; 60/488; 285/191; 138/39
[58] Field of Search ................ 60/456, 464, 487, 488; 92/57, 58.1; 91/499; 285/189, 191; 131/39

[56] References Cited

U.S. PATENT DOCUMENTS

| | | | |
|---|---|---|---|
| 3,213,616 | 10/1965 | Reinke | 60/456 X |
| 3,975,990 | 8/1976 | Kraus | 92/57 |
| 4,173,867 | 11/1979 | Schmidt et al. | 60/456 |

Primary Examiner—Edward K. Look
Assistant Examiner—George Kapsalas
Attorney, Agent, or Firm—Wood, Phillips, Mason, Recktenwald & VanSanten

[57] ABSTRACT

The problem of sealing a communication bore (56) in a port plate (40) is solved with a self-sealing transfer tube assembly (52). The transfer tube assembly (52) includes a coupling element (64) which is received in a supply bore (60) which intersects the communication bore (56). A relatively small window (78) is provided in the coupling element to provide hydraulic communication between the transfer tube assembly (52) and the port plate porting area (48), while its solid side wall (68) otherwise seals the outer portion of the communication bore (56).

11 Claims, 3 Drawing Sheets

SELF-SEALING TRANSFER TUBE FOR PORT PLATE

BACKGROUND OF THE INVENTION

1. Field of the Invention

This invention relates to hydrostatic machines and, more particularly, to a self-sealing hydraulic transfer tube therefor.

2. Description of the Prior Art

Electrical power generating systems in an aircraft often include an integrated drive generator system wherein an aircraft engine is used as a power source for an electrical generating system. In a typical system, a drive shaft connectable to an output shaft driven by the aircraft engine is connected to a mechanical differential, with the differential having an output connected to drive the generator. A variable speed transmission, such as a hydrostatic transmission, is associated with the mechanical differential and is controlled to modify the output of the differential, as required, whereby the input speed to the generator remains constant even though the speed of the drive shaft may vary.

A typical hydrostatic transmission in one form may include a fixed displacement motor hydraulically connected to a coaxial variable displacement pump. The pump and motor may be of the same basic structure, including rotatable cylinders in which pistons reciprocate under the control of a swash plate. The motor and pump are hydraulically connected through a port plate. Specifically, an input shaft of the transmission drives the pump to convert rotary movement to hydraulic pressure, which hydraulic pressure is used for operating the motor to drive an output gear. In order to maintain a supply of oil to the transmission, known systems employ a transfer tube hydraulically coupling a source of oil to the port plate.

A typical transfer tube is installed in hydraulic communication with the port plate by drilling a first or communication hole from an edge to the porting area of the port plate. A second hole, comprising an oil supply hole for receiving the transfer tube, is drilled in the port plate to intersect the communication hole. However, only one portion of the communication hole, i.e. the portion between the oil supply hole and the porting area, is needed. The outer portion of the communication hole must be sealed against oil pressure so that the proper amount of oil is supplied to the hydraulic oil circuit. Known systems have employed a straight recessed Allen socket set screw to seal the outer portion of the communication hole. However, during operation of the integrated drive generating system, this set screw can back out of the hole and cause oil starvation of the hydraulic unit.

Therefore, it is necessary to provide a vibration proof seal in order to prevent oil leakage from the hydrostatic transmission.

SUMMARY OF THE INVENTION

In accordance with the invention, a self-sealing transfer tube is provided for use in connection with a hydrostatic machine.

Broadly, there is disclosed herein means for providing communication between a hydraulic supply and a hydraulic machine of the displacement type. The hydraulic machine includes a port plate having opposite side walls connected by a peripheral edge wall and having port openings extending between the side walls to define hydraulic inlet and output ports. A first bore is inwardly directed from the edge wall of the port plate and opens into one of the port openings. A second bore through the port plate extends between the side walls and intersects the first bore. A transfer tube defines a tubular conduit having a side wall, an open end for connection to a hydraulic supply, a closed end and an aperture through the side wall adjacent to the closed end and opening into the conduit. Means are provided for mounting the transfer tube in the port plate second bore with the aperture aligned inwardly with the first bore to provide hydraulic communication between the one of the port openings and a hydraulic supply and with the side wall providing an outer seal in the first bore between the edge wall and the second bore.

It is a feature of the invention that the transfer tube has a narrower diameter at the closed end than at the open end and the closed end diameter is substantially equal to the diameter of the second bore.

It is another feature of the invention that the transfer tube further comprises an elongated tube received in the open end.

It is a further feature of the invention that the transfer tube is of single piece construction.

It is yet an additional feature of the invention that the transfer tube includes a shoulder between the open end and the aperture and wherein the mounting means mounts to the closed end to retain the shoulder in engagement with one of the port plate side walls.

According to an alternative embodiment of the invention, a hydrostatic transmission comprises a displacement pump, a displacement motor and a port plate. The port plate has opposite side walls connected by a peripheral edge wall, a plurality of port openings extending between the side walls, a first bore inwardly directed from the edge wall of the port plate and opening into one of the port openings, and a second bore through the port plate extending between the side walls and intersecting the first bore. Means are provided for mounting the port plate to provide hydraulic communication between the pump and the motor. A transfer tube has an outer wall, an open end for connection to a hydraulic supply, a closed end and an aperture through the outer wall adjacent to the closed end and opening into the tube. Means are provided for mounting the transfer tube in the port plate second bore with the open and closed ends on opposite sides of the port plate and the aperture aligned inwardly with the first bore to provide hydraulic communication between the one of the port openings and a hydraulic supply and with the outer wall providing a seal between the edge wall and the second bore.

The self-sealing transfer tube of the present invention is used for providing hydraulic coupling between an oil supply and a hydraulic unit port plate. The port plate is used for providing hydraulic communication between a fixed displacement motor and a variable displacement pump in a hydrostatic transmission. The port plate includes several ports therethrough for connecting the pump to the motor. In order to couple the port plate to the source of oil, it is preferred to utilize a transfer tube which extends parallel to a shaft of the hydrostatic transmission.

In order to provide a connection between the transfer tube and the port plate, prior construction utilized a communication hole drilled from a side edge to a porting area of the port plate, and a perpendicular oil supply hole which intersects the communication hole. The system previously utilized a transfer tube which included one end receivable in the oil supply hole. The end included a plurality of circumferential openings in communication with the communication hole when so installed. An Allen screw was used to close off the open, outer end of the communication hole.

According to the invention, the transfer tube is provided with only a single window or opening which is selectively aligned with the communication hole to provide a conduit to the port plate. The remaining circumferential portion of the transfer tube is solid so that the transfer tube seals the outer end of the communication hole.

Further features and advantages of the invention will readily be apparent from the specification and from the drawings.

DESCRIPTION OF THE INVENTION

Figure 1:
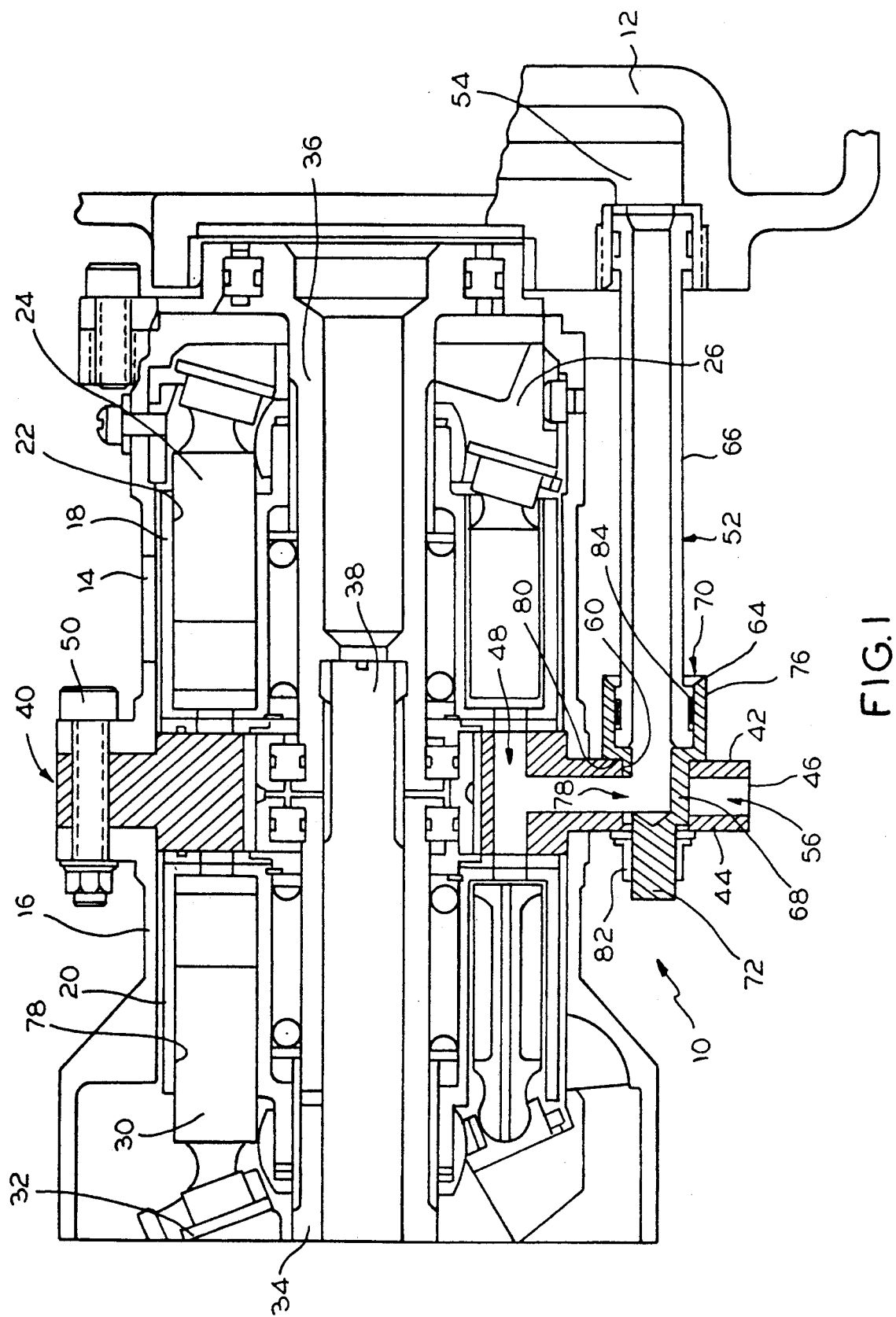
FIG. 1 is a plan section of a hydrostatic transmission including a self-sealing transfer tube according to one embodiment of the invention.

Referring first to FIG. 1, a variable speed transmission 10 is provided mounted in a housing, a portion of which is illustrated at 12, for an integrated drive generator system. The components of the system not shown include an electrical generator which is to be operated at a constant speed by means of a drive applied to a drive input shaft. The drive input shaft is connected to the generator through a mechanical differential which is also connected to the transmission 10, as is well known.

The variable speed transmission 10 is shown as a hydrostatic transmission having a hydraulically connected motor 14 and pump 16. The motor 14 is a fixed displacement motor having a rotational cylinder 18, while the pump 16 is a variable displacement pump having a rotational cylinder 20. The motor cylinder 18 includes a plurality of bores 22 for receiving pistons 24. The pistons 24 are operated under the control of a wobbler or swash plate 26 which is at a fixed angle. The pump cylinder 20 includes bores 28 each receiving a piston 30 under the control of a swash plate 32 which is mounted to have its angle varied by control structure, not shown, but which is well known in the art. The pump cylinder 20 is driven through an element of the mechanical differential, not shown, by a tubular shaft 34. The motor cylinder 18 drives an element of the differential through a shaft 36 which is connected to a shaft 38 which extends through the tubular shaft 34.

Figure 2:
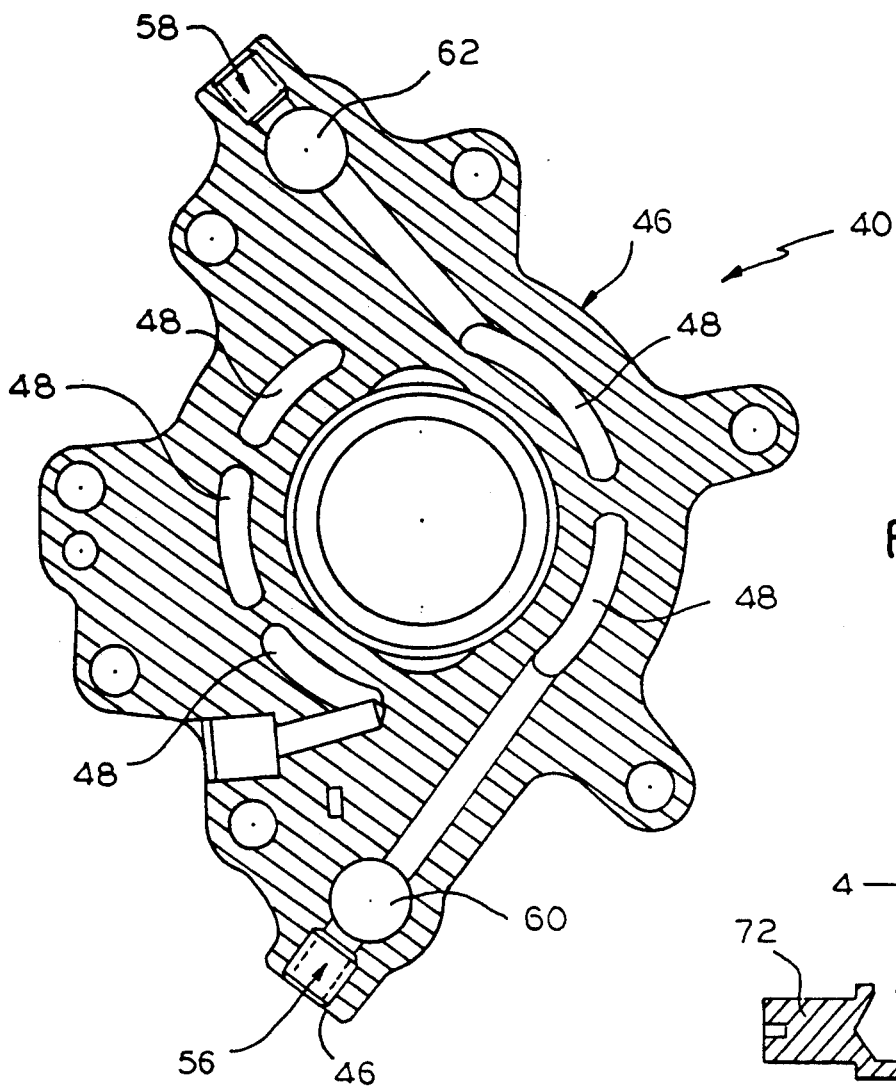
FIG. 2 is a sectional view taken along the line 2—2 of FIG. 1 illustrating a port plate, with other parts removed for clarity.

The motor 14 and pump 16 are hydraulically connected through a valve or port plate 40. With reference also to FIG. 2, the port plate 40 has opposite side walls 42 and 44 connected by a peripheral edge wall 46. A plurality of port openings 48 extend between the side walls 42 and 44. Specifically, the port plate 40 is mounted to the motor 14 and pump 16 such as by a fastener 50 which retains the structure so that the port openings 48 act as respective inlet and outlet ports between the pump 16 and motor 14, as is well known.

In order to provide a supply of oil to the port plate, a transfer tube assembly 52 is hydraulically coupled to the port plate 40 and to a source, illustrated at 54, of hydraulic supply, such as an oil supply.

Although only a single transfer tube assembly 52 is illustrated, the transmission 10 includes two such transfer tube assemblies 52, as is well known.

In order to mount the transfer tube assembly 52, a first bore 56 is drilled in the port plate 40 inwardly from the edge wall 46 and opening into one of the port openings 48. Another first bore 58 is provided for communicating with another of the port openings 48. Each of the first bores 56 and 58 is referred to herein as a communication bore.

A second, or oil supply, bore 60 is drilled to extend between the port plate side walls 42 and 44 such that it intersects the communication bore 56. Similarly, an additional supply bore 62 intersects the other communication bore 58.

Figure 3:
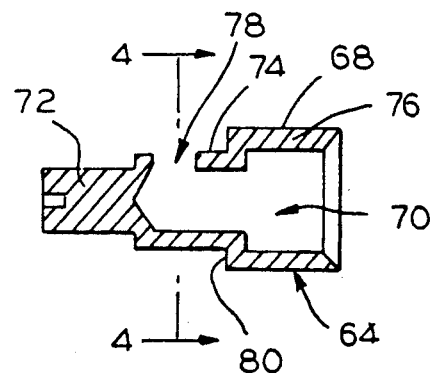
FIG. 3 is a sectional view of a transfer tube cylindrical coupling element of the transfer tube of FIG. 1.
Figure 4:
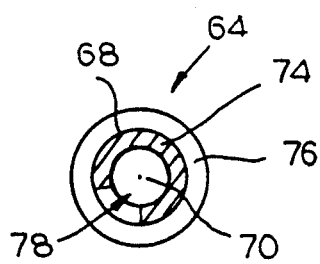
FIG. 4 is a sectional view taken along the line 4—4 of FIG. 3.

The transfer tube assembly 52 is of two piece construction and includes a coupling element 64 and an elongated conduit 66. With reference also to FIGS. 3 and 4, the coupling element 64 is cylindrical including a side wall 68 defining a longitudinally extending through opening or cavity 70. Specifically, the side wall 68 is tiered to provide a closed end 72 having a relatively narrow outer diameter which may be threaded; a midsection 74 having an inner diameter corresponding to the outer diameter of the closed end 72; and an open end 76 having an inner diameter corresponding to the outer diameter of the midsection 74. A window, or aperture, 78 is provided through a select circumferential portion of the side wall 68 at the midsection 74. Specifically, as illustrated in FIG. 4, the window 78 opens to less than a ninety degree portion of the inner side of the wall 68 and expands to a wider outer opening. The side wall 68 is otherwise solid.

With particular reference to FIG. 1, the outer diameter of the coupling element midsection 74 is substantially equal to the diameter of the port plate supply bore 60. In fact, the coupling element 64 is mounted in the port plate by inserting the coupling element 64 through the supply bore 60 so that the closed end 72 extends outwardly past the second side wall, and a shoulder 80 between the coupling element midsection 74 and open end 76 abuts the port plate first side wall 42. The coupling element 64 is rotationally aligned in the supply bore 60 so that the window 78 opens inwardly into the communication bore 56 towards the port opening 48. Thus, the coupling element cavity 70 is in communication with the port opening 48 through the window 78 and the inner portion of the communication bore 56. However, as discussed above, the window 78 extends through only a select minimal circumferential portion of the coupling element side wall 68. Therefore, owing to the above-described alignment of the window 78, the remaining section of the side wall 68 provides a seal between the supply bore 60 and the portion of the communication bore 56 adjacent the port plate edge wall 46.

The coupling element 64 is secured to the port plate 40 using a suitable fastener 82 which may be threadably received on the coupling element closed end 72. The conduit 66 is received in the bore 70 at the coupling element open end 76 and may be provided with a suitable seal 84.

Thus, oil received from the supply 54 passes through the conduit 66 into the coupling element cavity 70. Since the coupling element 64 includes a single, relatively small window 78, the hydraulic oil supply is directed inwardly through the communication bore 56 into the port opening 48 for supplying the pump 16 and motor 14. The solid side wall 68 otherwise seals the communication bore 56 outwardly towards the edge wall 46. Thus, it is unnecessary to provide a set screw to seal the open end of the communication bore 56.

Figure 5:
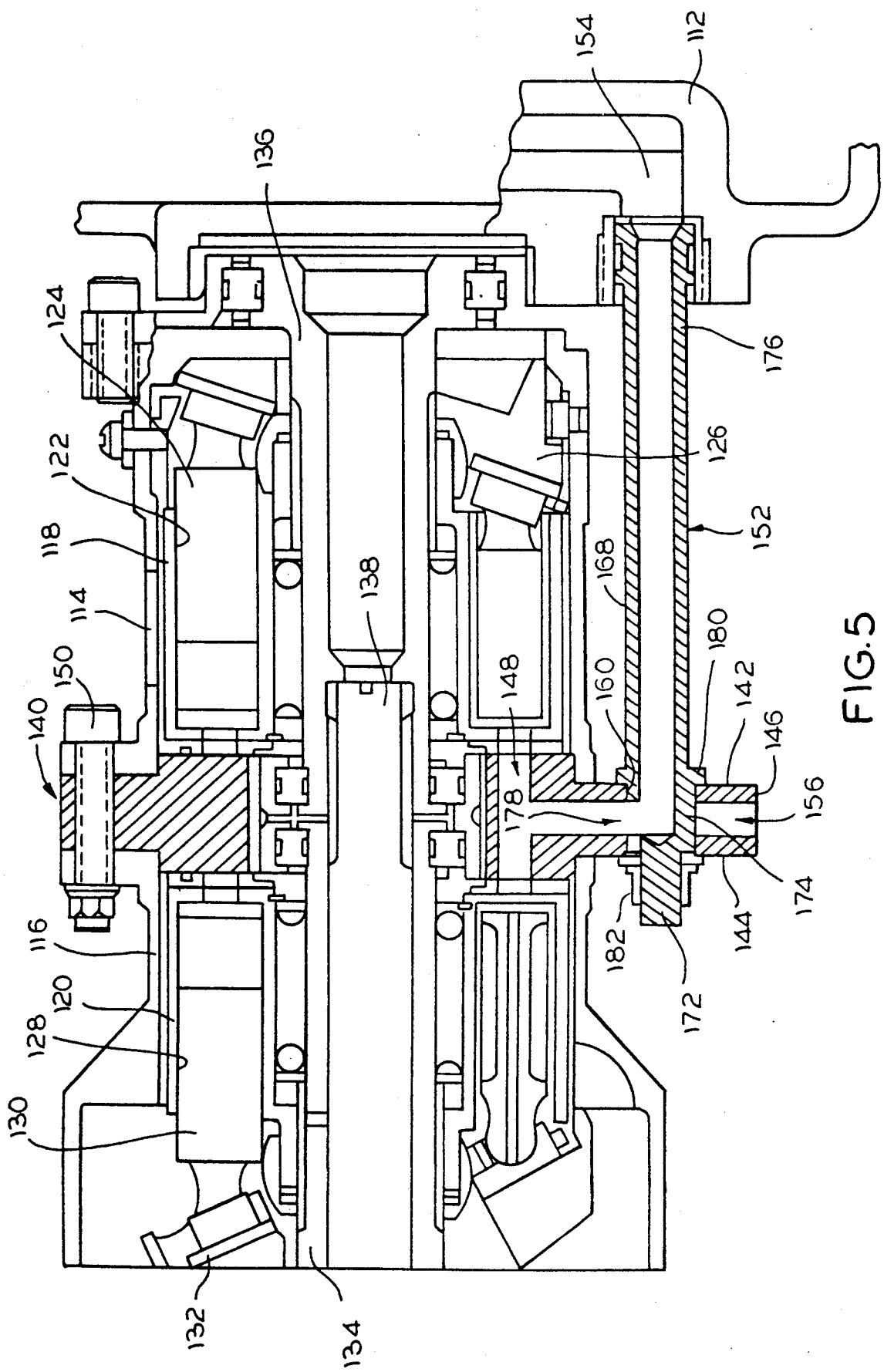
FIG. 5 is a plan section of a hydrostatic transmission including a self-sealing transfer tube according to another embodiment of the invention.

With reference to FIG. 5, a hydrostatic transmission 110 is identical to the hydrostatic transmission 10 of FIG. 1 except for the use of a single piece transfer tube 152. Therefore, details of the hydrostatic transmission 110 are not provided herein. For simplicity, like reference numerals in the 100 series are provided for like elements. For example, the motor 14 of FIG. 1 corresponds to the motor 114 of FIG. 5.

Figure 6:
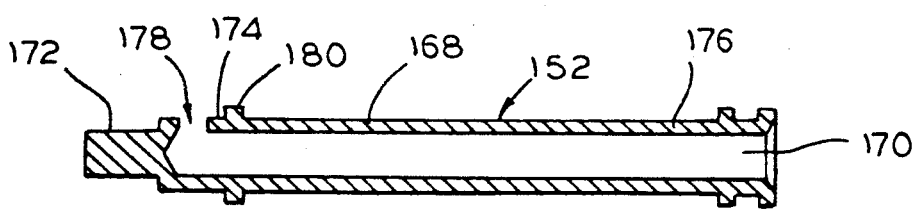
FIG. 6 is a sectional view of the transfer tube of FIG. 5.

With reference also to FIG. 6, the transfer tube 152 comprises an elongated tube having an outer side wall 168 and a longitudinally extending through opening or cavity 170. The outer diameter of the side wall 168 is substantially constant across its length, except for a narrower closed end 172. A midsection 174 is disposed between the closed end 172 and an open end 176. An aperture or window 178, similar to the window 78, see FIGS. 3 and 4, is provided in the midsection 174. A shoulder comprising a circumferential annular ridge 180 extends about the side wall 168 immediately opposite the opening 178 from the closed end 172.

With particular reference to FIG. 5, the transfer tube 152 is mounted to the port plate 140 by extending the closed end 172 through the oil supply bore 160 until the shoulder 180 abuts the port plate side wall 142. A fastener 182 is received on the closed end 174 for retaining the shoulder 180 in abutment with the side wall 142 and with the transfer tube 152 aligned so that the window 178 opens inwardly into the communication bore 156 towards the port opening 148. Thus, a hydraulic path is established between the source 154 of hydraulic oil into the port opening 148. However, the outer end of the communication bore 156 at the edge wall 146 is effectively sealed by the solid side wall 168 of the transfer tube 152.

Thus, according to the invention, either a single piece or two piece transfer tube is provided which eliminates the necessity of an Allen set screw and the expense related with its installation by directly blocking the outer portion of the communication bore.

Particularly, the self-sealing transfer tube according to the invention eliminates the additional tapping operation required at the outer end of the communication bore to receive an Allen screw or similar sealing device. Further, the need for the Allen screw is eliminated along with the assembly and testing which would otherwise be required.

Although the self-sealing transfer tube connection is described herein for use with a hydrostatic transmission, such a transfer tube and connection could also be used in connection with any hydraulic machine, particularly a hydraulic machine of the displacement type such as a displacement pump or motor, either of the fixed or variable type.

I claim:

1. In a hydraulic machine of the displacement type including a port plate having opposite side walls connected by a peripheral edge wall and having port openings extending between said side walls to define hydraulic inlet and outlet ports, a means for communicating with a hydraulic supply comprising:
   a first bore inwardly directed from the edge wall of said port plate and opening into one of said port openings;
   a second bore through said port plate extending between said sidewalls and intersecting said first bore;
   a transfer tube defining a tubular conduit having a sidewall, an open end for connection to a hydraulic supply, a closed end and an aperture through said sidewall adjacent to said closed end and opening into said conduit; and
   means mounting said transfer tube in said port plate second bore with said aperture aligned inwardly with said first bore to provide hydraulic communication between the one of said port openings and a hydraulic supply and with said side wall providing a seal between said edge wall and said second bore.

2. The communicating means of claim 1 wherein said transfer tube has a narrower diameter at said closed end than at said open end and said closed end diameter is substantially equal to the diameter of said second bore.

3. The communicating means of claim 1 wherein said transfer tube further comprises an elongated tube received in said open end.

4. The communicating means of claim 1 wherein said transfer tube is of single piece construction.

5. The communicating means of claim 1 wherein said transfer tube includes a shoulder between said open end and said aperture and wherein said mounting means mounts to said closed end to retain said shoulder in engagement with one of said port plate side walls.

6. A hydrostatic transmission comprising:
   a displacement pump;
   a displacement motor;
   a port plate having opposite side walls connected by a peripheral edge wall, a plurality of port openings extending between said side walls, a first bore inwardly directed from the edge wall of said port plate and opening into one of said port openings, and a second bore through said port plate extending between said sidewalls and intersecting said first bore;
   means for mounting said port plate to provide hydraulic communication between said pump and said motor;
   a transfer tube having an outer wall, an open end for connection to a hydraulic supply, a closed end and an aperture through said outer wall adjacent to said closed end and opening into said tube; and
   means mounting said transfer tube in said port plate second bore with said open and closed ends on opposite sides of said port plate and said aperture aligned inwardly with said first bore to provide hydraulic communication between the one of said port openings and a hydraulic supply and with said outer wall providing a seal between said edge wall and said second bore.

7. The hydrostatic transmission of claim 6 wherein said transfer tube has a narrower diameter at said closed end than at said open end and said closed end diameter is substantially equal to the diameter of said second bore.

8. The hydrostatic transmission of claim 6 wherein said transfer tube further comprises an elongated conduit received in said open end.

9. The hydrostatic transmission of claim 6 wherein said transfer tube is of single piece construction.

10. The hydrostatic transmission of claim 6 wherein said transfer tube includes a shoulder on said outer wall between said open end and said aperture and wherein said mounting means mounts to said closed end to retain said shoulder in engagement with one of said port plate side walls.

11. In a hydrostatic transmission including a displacement pump, a displacement motor, a port plate having opposite side walls connected by a peripheral edge wall, a plurality of port openings extending between said side walls, first and second communication bores inwardly directed from the edge wall of said port plate and opening into two of said port openings, and first and second oil supply bores through said port plate extending between said sidewalls and intersecting said respective first and second communication bores, and means for mounting said port plate to provide hydraulic communication between said pump and said motor, the improvement comprising:

first and second transfer tubes each having an outer wall, an open end, a closed end and an aperture through said outer wall adjacent to said closed end and opening into said tube; and means mounting said first and second transfer tubes in said port plate respective first and second oil supply bores each with said open and closed ends on opposite sides of said port plate and said apertures aligned inwardly with said respective first and second communication bores to provide hydraulic communication between said port openings and a hydraulic supply and each with said outer wall providing a seal between said edge wall and said respective first and second oil supply bores.

* * * * *